Nov. 13, 1945.    C. EISLER, JR    2,389,034
WELDING MACHINE
Filed Feb. 18, 1944    4 Sheets-Sheet 1
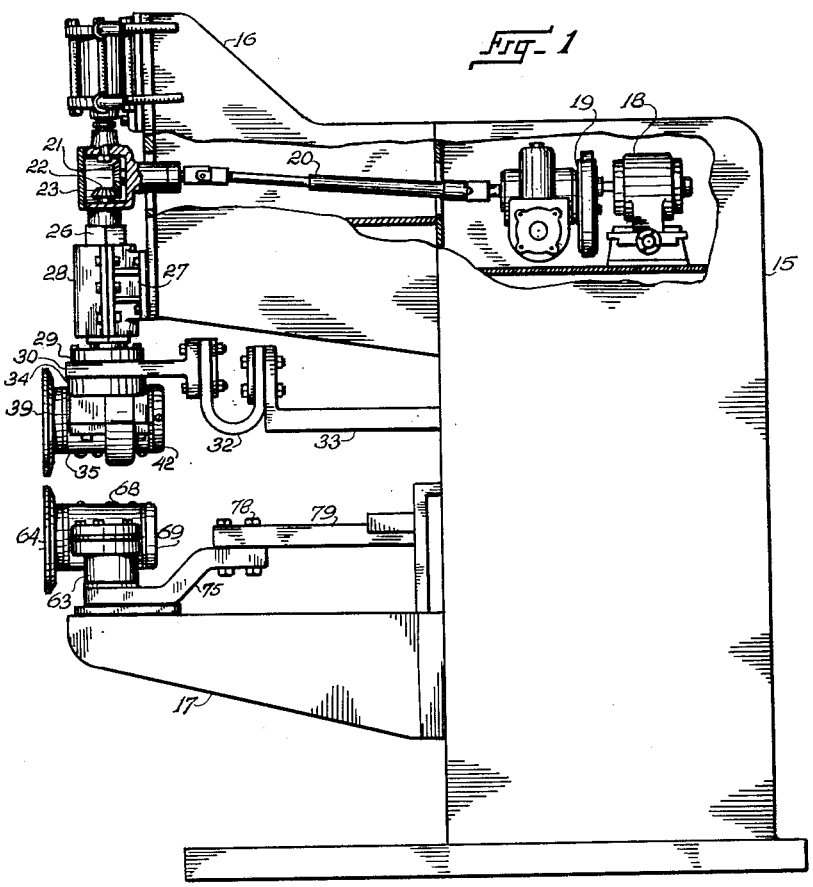
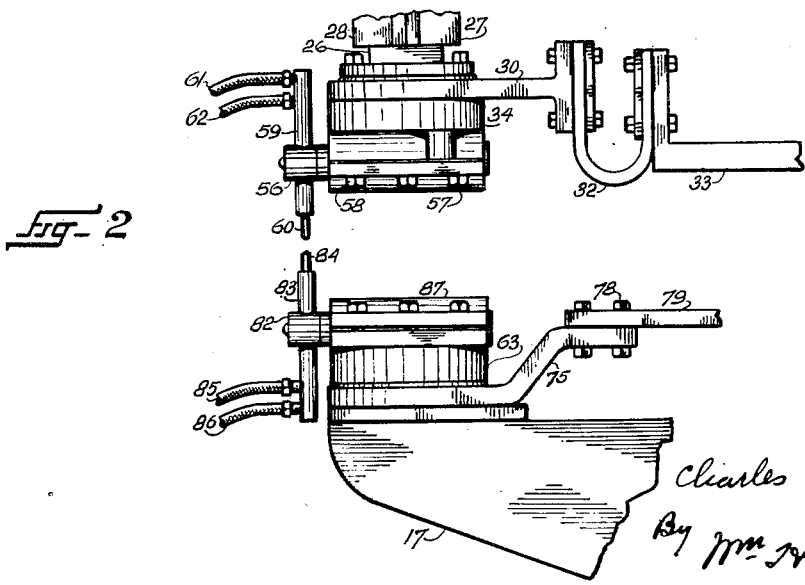
INVENTORS
Charles Eisler, Jr.,
By Wm H Campfield
ATTORNEY

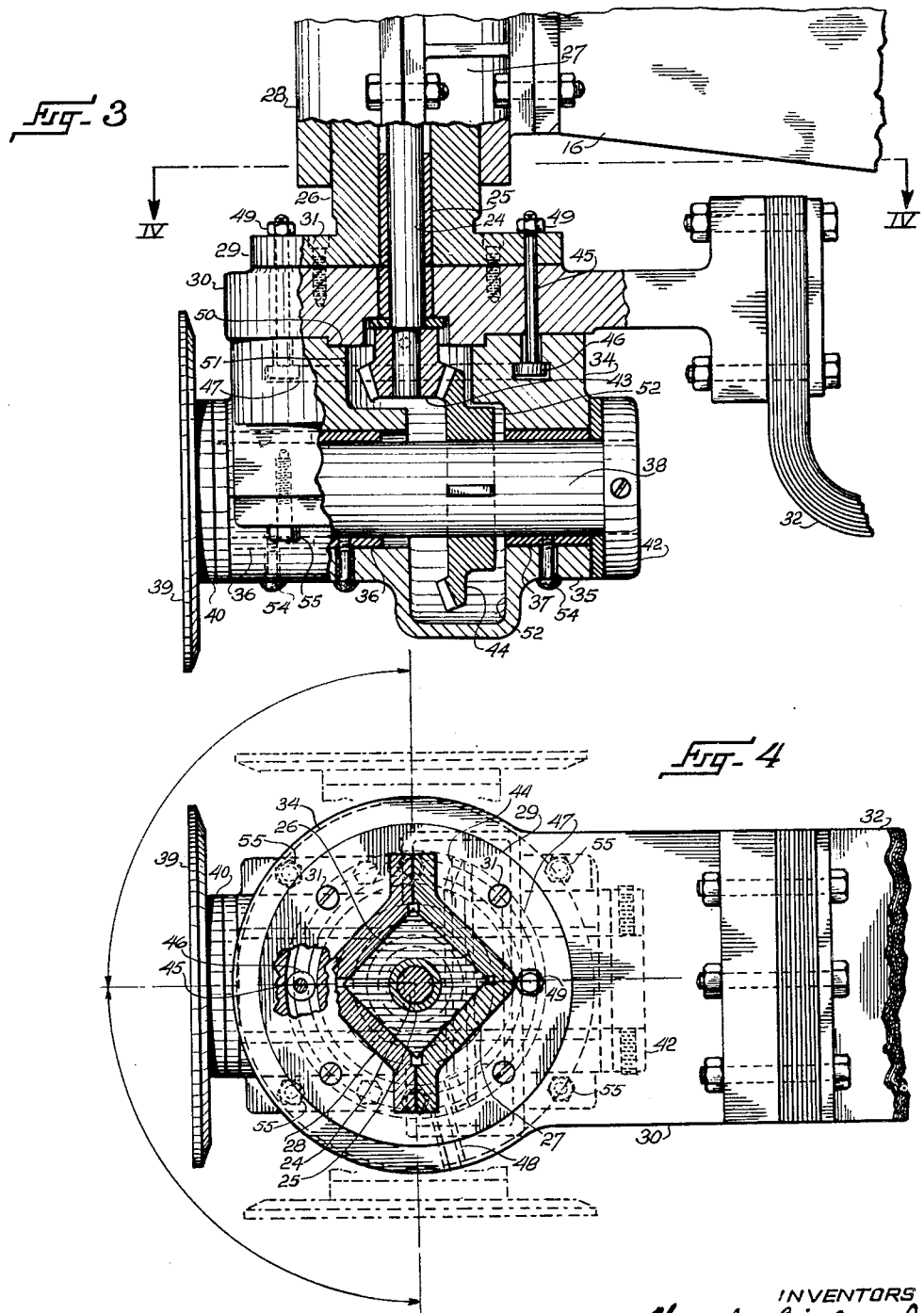

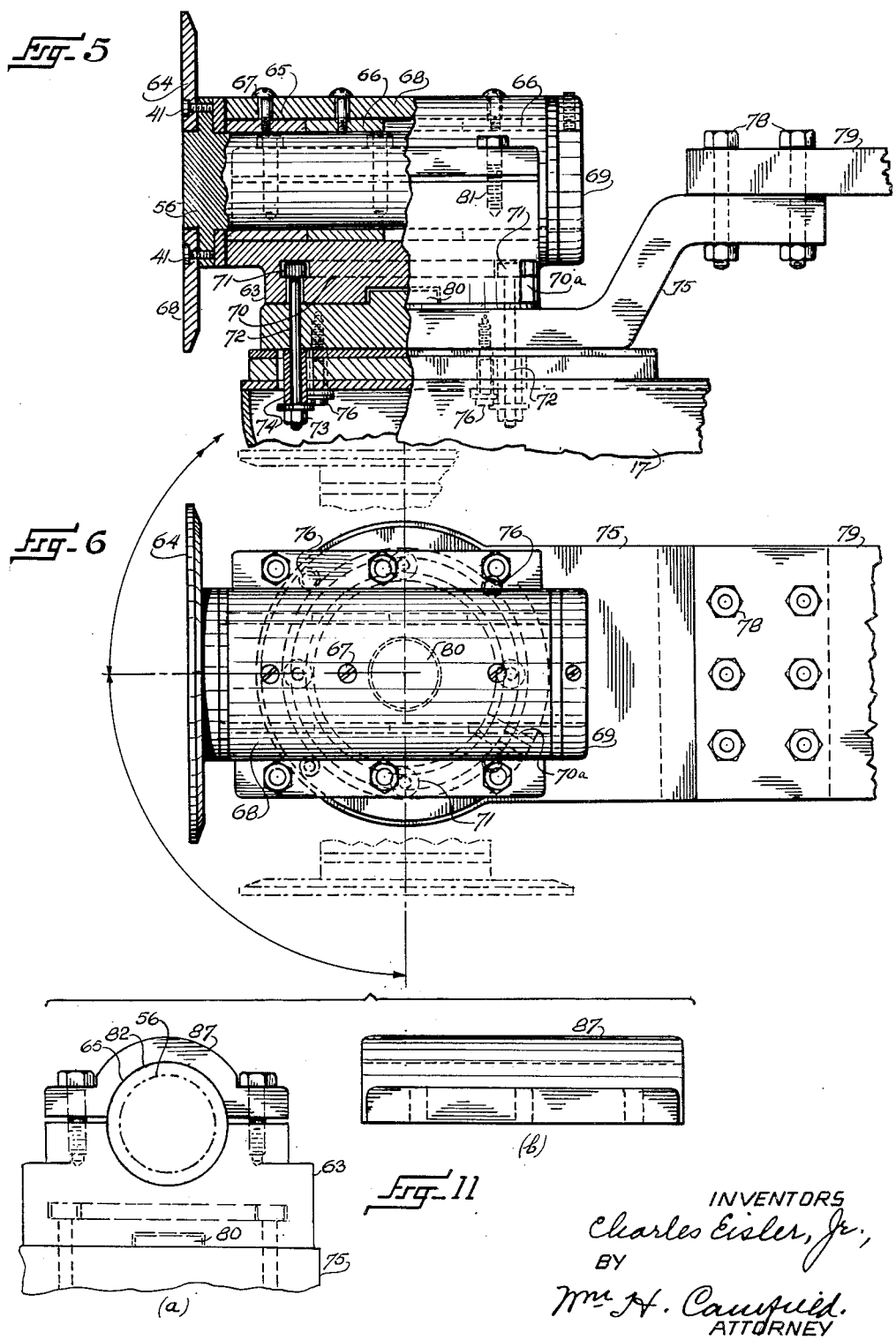

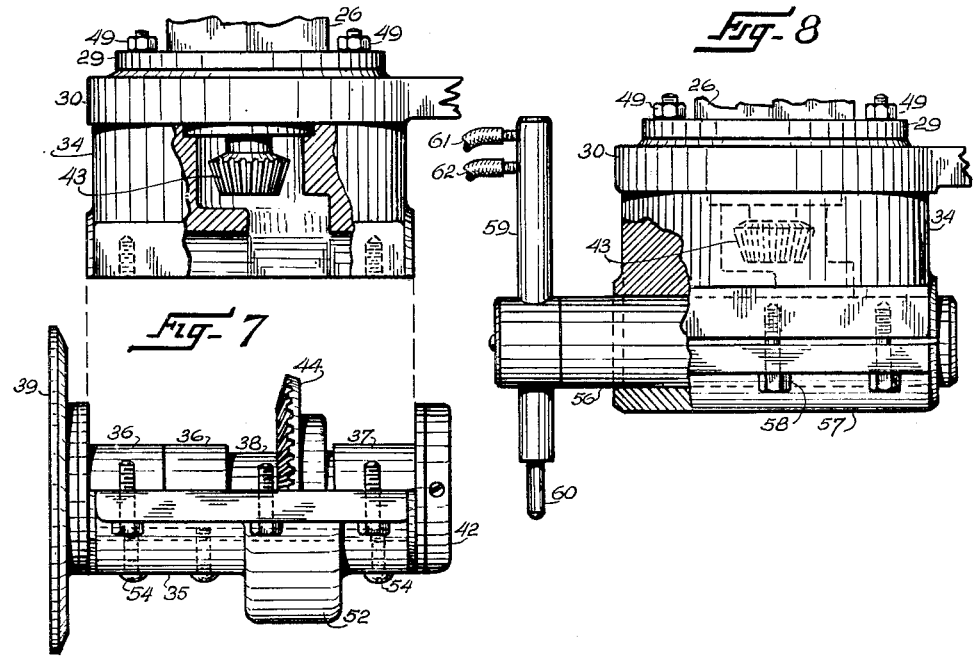
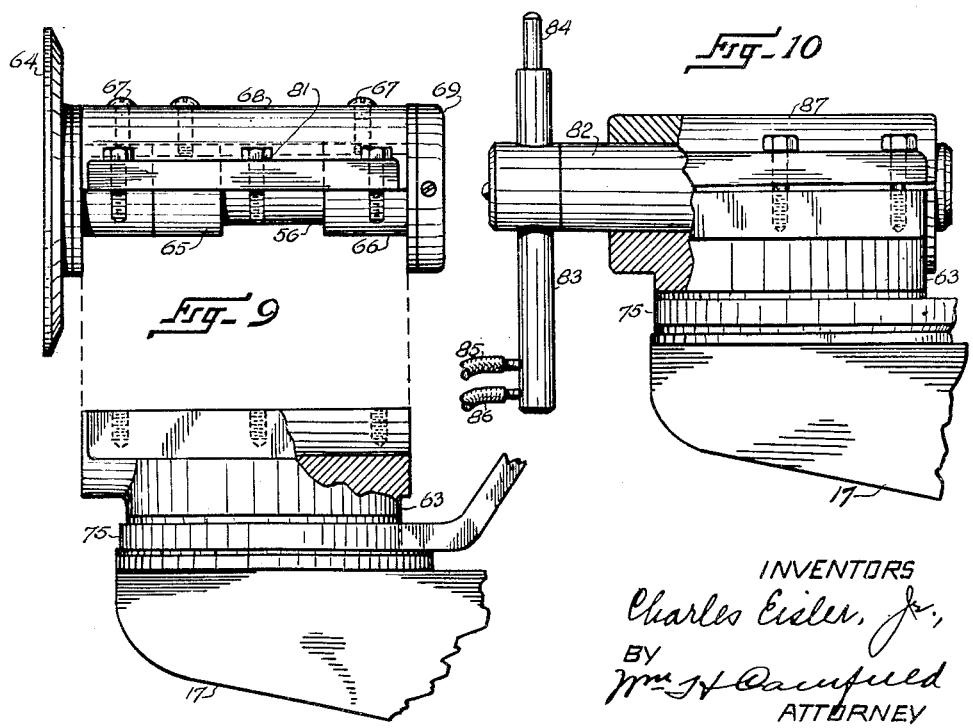

Patented Nov. 13, 1945

2,389,034

UNITED STATES PATENT OFFICE 2,389,034

WELDING MACHINE

Charles Eisler, Jr., Maplewood, N. J., assignor to Eisler Engineering Company, Newark, N. J.

Application February 18, 1944, Serial No. 522,943

2 Claims. (Cl. 219—4)

This invention relates to an improved welding machine which is constructed to provide means for supporting and operating alternative and selective welding horns whereby the machine can be easily and quickly converted into either a seam-welding machine or a spot-welding machine.

The improved machine is also novel in having rotatably adjustable turrets for the welding devices in order to function at various angles necessitated by particular or unusual jobs that would otherwise be much more difficult and sometimes impossible of accomplishment on a single machine.

The improved machine is new in having power-driven seam-welding devices which can be quickly replaced by fixed spot-welding devices and vice-versa with no major alterations in the machine for such conversion.

The invention is illustrated in the accompanying drawings, in which Figure 1 is an elevational view of the welder equipped with seam-welding wheels. Figure 2 is a view of the working parts of the machine equipped for spot-welding. Figure 3 is a sectional view of the upper seam-welding mechanism. Figure 4 is a plan view taken on line IV—IV in Figure 3. Figure 5 is an elevation, shown partially in section, of the lower seam-welding mechanism. Figure 6 is a plan view of the parts shown in Figure 5. Figures 7 and 8 are views illustrating the manner in which the upper seam-welding unit is converted into a spot-welding unit. Figures 9 and 10 illustrate the manner in which the lower seam-welding unit is converted into a spot-welding unit. Figure 11 illustrates at (a) the diametral relation between the spot-welding horns and seam-welding horns and at (b) shows the one additional element necessary for conversion.

Referring to Figure 1 it will be seen that the welder has the main frame 15 provided with the upper and lower supports 16 and 17 which carry the upper and lower turrets for the welding tools.

When the welding machine is operated as a seam-welder the motor 18, by means of the transmission mechanism 19 and the propelling shaft 20, actuates the bevel gears 21 and 22 (which are enclosed in the housing 23), and the vertical shaft 24. The shaft 24 is journalled in the bearings 25 which are mounted in the ram 26. The ram 26, which is non-circular in section, preferably square, as shown in Figure 4, is mounted in the slide bearing 27 which is secured to the support 16 and which can be adjusted to the required height by easing and subsequently tightening the bolts of the cap 28. The ram 26, which is provided with the flange 29 is secured to the upper turret holder 30 by suitable means such as the screws 31, the upper turret holder being connected by the usual flexible conduit 32 to the secondary connection 33.

Rotatably carried by the turret holder is the turret 34 with its bearing cap 35 enclosing the bushings 36 and 37, in which is journalled the seam-welding horn 38 to which is secured the seam-welding disc or wheel 39 by screws 41 to the flange 40, the collar 42 holding the horn against axial displacement. Rotation is imparted to the welding wheel by the bevel gear 43 which is mounted on the lower end of the shaft 24 and which meshes with a bevel gear 44 keyed on the horn 38.

The turret is secured to the turret holder 30 and the ram 26 by the bolts 45 provided with the bolt heads 46 engaging the circular T-slots 47 in the turret, the bolts being introduced into the slots by way of the T-gate 48. By easing the nuts 49 of the bolts 45 the bolt heads 46 are enabled to slide in the T-slot and the turret together with the horn and welding wheel can then be swung about the centering boss 50 of the turret holder to as much as 90 degrees deviation from the normal, in either direction, as shown in broken lines in Figure 4. The turret is provided with the recess 51 for the gear 43 and the recess 52 for the gear 44, the latter recess being continued in the cap 35.

The bushings 36 and 37 which may be either of the single split type or of the non-split type are retained in cap 35 by the screws 54. By removing the bolts 55 by which the cap is secured to the turret, the horn 38 assembled with the welding wheel, bushings, gear and cap can be bodily removed from the turret as shown in Figure 7.

The spot-welding horn 56, the diameter of which is the same as the outside diameter of the bushings is then installed in the turret and held in place by the cap 57, the flanges of which do not quite reach those of the turret, to obtain a clamping effect by tightening the bolts 58. Fixed in the spot-welding horn by the usual retaining means is the electrode holder 59 with the electrode 60 and the water-cooling ducts 61 and 62.

In its essential features the lower turret 63 is similar to the upper turret except, of course, that no provision is made in the casting for housing gears since the lower welding wheel 64 and its horn 56 are rotationally entrained by the metal sheets being welded as they pass between the welding wheels. The turret 63 then affords support for the lower seam-welding horn 56 journalled in the bushings 65 and 66, which bushings are secured to the bearing cap 68 by the screws 67. The horn 56 is held against axial displacement by the collar 69.

The turret 63 has the T-slot 70 which retains the heads 71 of the bolts 72, these bolts being introduced into the slot by the T-gate 70a. The bolts 72 by the nuts 73 and spacer washers 74 clamp the turret to the lower turret holder 75. The turret holder 75 is secured to the lower frame support or table 17 by the insulated bolts 76. The turret holder 75 is joined to the secondary connection 79 by the bolts 78.

As in the case of the upper turret, the lower turret, by easing the nuts 73 can be swung about the centering boss 80 of the lower turret holder 75 in either direction, as indicated by arrows in Figure 6.

The lower seam-welding horn 56, assembled with wheel, bushings and bearing caps can be bodily removed from the turret by unscrewing the bolts 81 which clamp the bearing cap 68 to the turret, as shown in Figure 9. The spot-welding horn 82, the diameter of which, as in the case of the upper horn is equal to the outside diameter of the bushings 65 and 66, is then installed and clamped in place by the cap 87, as shown in Figure 10.

Figure 11a illustrates the relation between the diameters of the seam-welding horns, as 56, the bushings as 65, and the spot-welding horns as 82, the illustrations applying equally to the upper electrodes, as well as the lower ones. The lower spot-welding horn 82 carries the electrode holder 83 with electrodes 84 and the water-cooling ducts 85 and 86.

It will be evident that with a single machine it is possible to easily and quickly accomplish either spot-welding or seam-welding with a simple change of welding devices, quickly accomplished, and adapted for various angular disposition of the welding devices in jobs requiring such dispositions of the welding devices.

I claim:

1. In a welding machine, a support, a slide bearing secured to said support, a ram positioned in said slide bearing, means to clamp said bearing on said ram, a flange on said ram, a turret holder, a boss on said holder, means to secure said flange to said turret holder, a turret having a recessed portion for complementary engagement with said boss to rotatably position said turret on said holder, said turret having a circular slot of T cross section, and a gate of T cross section communicating with said slot, bolts positioned in said slot through the gate thereof, and heads on said bolts engaging said slot to suspend the turret on said bolts, said turret holder and ram having apertures to receive said bolts, means to secure a welding member to said turret, and means engaging said bolts and ram flange to lock the parts together when tightened and to enable the turret to be rotated on said bolts when the engaging means are loosened.

2. In a welding machine, a support, a slide bearing secured to said support, a ram positioned in said slide bearing, means to clamp said bearing on said ram, a flange on said ram, a turret holder, a turret having a circular slot of T cross section, bolts positioned in said slot, and heads on said bolts engaging said slot to suspend the turret on said bolts, said turret holder and ram having means to receive said bolts, means to secure a welding member to said turret, and means engaging said bolts and ram flange to lock the parts together when tightened and to enable the turret to be rotated on said bolts when the engaging means are loosened.

CHARLES EISLER, JR.